United States Patent
Ziffer

[15] 3,694,501
[45] Sept. 26, 1972

[54] PROCESS FOR PRODUCING SODIUM GLUCONATE

[72] Inventor: Jack Ziffer, Milwaukee, Wis.

[73] Assignee: Pabst Brewing Company, Milwaukee, Wis.

[22] Filed: March 4, 1971

[21] Appl. No.: 121,201

[52] U.S. Cl. .................260/527 R, 260/535 R
[51] Int. Cl. ...................................C07c 59/06
[58] Field of Search..............................260/535

[56] References Cited

FOREIGN PATENTS OR APPLICATIONS 1,130,431   8/1958   Germany...................260/535

Primary Examiner—Lorraine A. Weinberger
Assistant Examiner—Paul J. Killos
Attorney—Johnston, Root, O'Keeffe, Keil, Thompson & Shurtleff

[57] ABSTRACT

The undesirable darkening or discoloration of solid sodium gluconate produced by evaporating water from an aqueous solution thereof is reduced or eliminated by introducing into such a solution a sufficient amount of sodium sulfite to inhibit discoloration of the resultant solid product.

8 Claims, No Drawings

PROCESS FOR PRODUCING SODIUM GLUCONATE

BACKGROUND

It is known in the art to prepare a technical grade sodium gluconate from a liquid gluconic acid-gluconate composition made by a fermentation process as described in U.S. Pat. No. 3,454,501 and according to the process claimed in U.S. patent application Ser. No 821,516 filed Aug. 15, 1968.

It has been found that the production of technical grade sodium gluconate from a liquid gluconic acid-sodium gluconate composition of the type described on a plant scale by neutralization and atmospheric drum drying does not give the desired white product but rather a darkened or tan product. This darkening of the sodium gluconate product is apparently due to trace impurities, probably carbohydrates, and the heat treatment which occurs in the drying operation. As a consequence, technical grade sodium gluconate is produced which is tan in color rather than white and while this does not impair the effectiveness of the product, it leaves much to be desired from the standpoint of appearance.

It is possible to separate pure sodium gluconate by crystallization but this is relatively expensive and it is highly desirable to produce a sodium gluconate by directly evaporating an aqueous solution of sodium gluconate while at the same time inhibiting discoloration of the resultant solid product.

OBJECTS

One of the objects of this invention is to provide a new and improved process for inhibiting discoloration of solid sodium gluconate produced by evaporation of an aqueous solution of sodium gluconate.

Another object of the invention is to provide a new and improved process for producing solid sodium gluconate from an aqueous gluconic acid-sodium gluconate solution while inhibiting discoloration of the resultant product.

A further object of the invention is to provide a new and improved process of the type described in which discoloration of the product is inhibited by the addition of a small amount of a relatively inexpensive substance which does not materially affect the properties of the resultant product.

Another object of the invention is to provide a new and improved technical grade sodium gluconate which is inhibited against discoloration. Other objects will appear hereinafter.

BRIEF SUMMARY OF THE INVENTION

In accordance with the invention solid sodium gluconate is prepared by a process in which an aqueous solution of sodium gluconate is evaporated and a quantity of sodium sulfite sufficient to inhibit discoloration of the resultant product is introduced into said solution so as to be present during said evaporation. The sodium sulfite can either be added as such or it can be formed in situ in the solution.

DETAILED DESCRIPTION OF THE INVENTION

The best mode contemplated for the practice of the invention is to start with an aqueous solution of sodium gluconate comprising a fermentation liquor containing gluconic acid and sodium gluconate having an acidic pH and add sodium bisulfite to said liquor while the pH is acidic. Thereafter the liquor is neutralized with caustic soda and evaporated. The neutralization with caustic soda converts the sodium bisulfite to sodium sulfite. The evaporation is preferably effected on an atmospheric drum rotary drier.

Instead of adding all of the sodium bisulfite initially, a part of the sodium bisulfite can be added to the liquor after the liquor has been at least partially neutralized. Sodium bisulfite can also be added after the liquor has been neutralized. Instead of sodium bisulfite, sodium sulfite can be added at any stage of the process. However, sodium bisulfite has the advantage that it is a less expensive form of sulfite on a weight basis.

It would also be possible to introduce the sulfite in the form of other compounds which form sulfite ions in solution, for example, sodium hydrosulfite, potassium bisulfite, potassium sulfite, or other water soluble alkali metal sulfites. It would be undesirable to use bisulfites or sulfites which form insoluble gluconates because this might interfere with the end of the products.

When the process is carried out by neutralizing and evaporating a gluconic acid-sodium gluconate solution, any of such solutions described in U.S. Pat. NO. 3,454,501 can be used. Usually, such solutions are liquid compositions having a dissolved solids content of 50 percent to 90 percent by weight and consisting essentially of a mixture of gluconic acid and sodium gluconate in water, the weight ratio of gluconic acid to sodium gluconate being within the range of 0.06:1 to 44:1 and preferably within the range of 0.9:1 to 4:1.

The introduction of the sulfite in a process of the type described makes it possible to produce a white sodium gluconate in a very economic process, eliminating the losses in crystallization and filtration, and the need for mother liquor re-work and eventual disposal in conventional processes where the sodium gluconate is recovered by crystallization.

The addition of the sulfite also has the unexpected additional advantage that if the drying operation is interrupted for an extended period, the sulfite will prevent any organism growth or color development. Thus, in one case as hereinafter described, due to an unanticipated change in the drier schedule, it was necessary to hold the neutralized gluconate mixture for 7 days before completing the drying operation. Due to the presence of the sulfite there was no trouble in holding the mixture for this period and there were no signs of organism growth or any other changes. The data indicated that the resultant white sodium gluconate solid was perfectly normal.

The presence of the sulfite in the dry sodium gluconate has a similar advantage if the user prepared solutions and allowed them to stand for an appreciable time.

The quantity of sulfite used in order to inhibit discoloration is subject to some variation and may vary to some extent depending upon the type of drying process. When atmospheric drum drying is used, the conditions are rather severe and larger quantities of sulfite may be required than where vacuum conditions are employed or where solutions are spray dried. The quantity of sulfite used will also vary depending upon the degree of whiteness desired.

Visual color is not a completely true evaluation, as it is, to a certain extent, dependent upon the particle size of the product. A better color evaluation is obtained by means of a Klett value. The Keltt value is a colorimeter determination of a 10 percent (w/v) solution of the sodium gluconate sample using a Klett-Summerson photoelectric colorimeter. Desirably, the Klett value should be less than 100.

In general, using atmospheric rotary drum drying evaporation the quantity of sulfite calculated on the basis of sodium bisulfite should be in excess of 0.2 percent by weight of the sodium gluconate and very good results have been obtained with an amount of sulfite, expressed as bisulfite, which is 0.3–0.6 percent by weight of the sodium gluconate.

In the following examples, Examples I and II illustrate the results obtained without introducing a sulfite and the remaining examples illustrate the results obtained with the introduction of a sulfite. Unless otherwise indicated, the quantities are given in parts by weight.

Example I a. Gluconic acid-sodium gluconate concentrate (6200 gallons, specific gravity 1.347, pH 3.3) containing 39.84 percent (w/w) gluconic acid and 67.84 percent (w/w) sodium gluconate equivalent (gluconic acid:sodium gluconate ratio = 1.69) was neutralized to pH 6.8 = — 7.2 with 50 percent by weight aqueous sodium hydroxide and the resultant mixture dried on an atmospheric single drum rotary drier (55–60 lbs. per square inch steam pressure). A tannish sodium gluconate solid of 98.2 percent purity was obtained. A 10 percent (w/v) aqueous solution of the solid had a Klett value of 640.

b. Gluconic acid-sodium gluconate concentrate (6150 gallons, specific gravity 1.3596, pH 3.3) containing 43.05 percent (w/w) gluconic acid and 67.37 percent (w/w) sodium gluconate equivalent (gluconic acid : sodium gluconate ratio = 2.21) was neutralized to pH 6.8 — 7.2 with 50 percent by weight aqueous sodium hydroxide and the resultant mixture dried on an atmospheric single drum rotary drier (55–60 lbs. per square inch steam pressure). An off-white sodium gluconate solid of 98.1 percent purity was obtained. A 10 percent (w/v) aqueous solution of the solid had a Klett value of 510.

EXAMPLE II

The procedures of Example I were repeated for a series of neutralization and drying runs and the data obtained are shown in the following Table I.

TABLE I

| Gluconic Acid-Sodium Gluconate Concentrate | | | Dry Sodium Gluconate | | |
|---|---|---|---|---|---|
| Concentrate Gallons | Gluconic Acid: Sodium Gluconate Ratio | Sodium Gluconate, % (w/w) Equivalent | Sodium Gluconate Purity % (w/w) | Visual Color | Klett Value |
| 2500 | 1.15 | 65.04 | 98.3 | Tannish | 460 |
| 6100 | 1.67 | 68.29 | 99.2 | Tannish | 605 |
| 7750 | 1.03 | 68.43 | 98.5 | Tannish | 560 |
| 7800 | 1.16 | 65.60 | 97.5 | Tannish | 650 |
| 7300 | 0.98 | 67.26 | 99.0 | Tannish | 420 |
| 6200 | 1.77 | 68.52 | 99.1 | Off-white | 375 |
| 4400 | 1.78 | 69.01 | 99.4 | Off-white | 303 |
| 5800 | 1.57 | 67.31 | 98.1 | Tannish | 280 |

EXAMPLE III a. Sodium bisulfite (34 lbs., 0.16 percent (w/w) based on the sodium gluconate weight) was added with agitation to a gluconic acid-sodium gluconate concentrate (2,925 gallons, specific gravity 1.3368, pH 3.3) containing 39.20 percent (w/w) gluconic acid and 65.08 percent (w/w) sodium gluconate equivalent (gluconic acid:sodium gluconate ratio = 1.82). The mixture was then neutralized to pH 6.8 – 7.2 with 50 percent by weight sodium hydroxide and the resultant mixture dried on an atmospheric single drum rotary drier (55–60 lbs. per square inch steam pressure). An off-white sodium gluconate solid of 97.9 percent purity was obtained. A 10 percent (w/v) aqueous solution of the solid had a Klett value of 125.

b. Sodium bisulfite (58 lbs., 0.33 percent (w/w) based on the sodium gluconate weight) was added with agitation to a gluconic acid-sodium gluconate concentrate (2,350 gallons, specific gravity 1.3348, pH 3.3) containing 39.74 percent (w/w) gluconic acid and 66.98 percent (w/w) sodium gluconate equivalent (gluconic acid:sodium gluconate ratio = 1.74). The mixture was then neutralized to pH 6.8–7.2 with 50 percent by weight sodium hydroxide and the resultant mixture dried on an atmospheric single drum rotary drier (55–60 lbs. per square inch steam pressure). A white sodium gluconate solid of 99.2 purity was obtained. A 10 percent (w/v) aqueous solution of the solid had a Klett value of 42.

EXAMPLE IV

The procedures of Example III were repeated for a series of neutralization and drying runs and the data obtained are shown in the following Table II.

TABLE II

| Gluconic Acid-Sodium Gluconate Concentrate | | | Dry Sodium Gluconate | | | |
|---|---|---|---|---|---|---|
| Concentrate gallons | Gluconic Acid: Sodium gluconate ratio | Sodium gluconate, % (w/w) equivalent | Sodium bisulfite added % (w/w)* | Sodium gluconate purity % (w/w) | Visual Color | Klett Value |
| 3600 | 1.84 | 65.25 | 0.33 | 97.7 | White | 54 |
| 3200 | 1.86 | 66.60 | 0.33 | 99.3 | White | 71 |
| 3250 | 1.72 | 64.38 | 0.34 | 98.3 | White | 91 |
| 3200 | 1.83 | 67.70 | 0.33 | 98.5 | White | 60 |
| 3200 | 1.83 | 67.70 | 0.41 | 98.7 | White | 49 |
| 3200 | 1.83 | 68.34 | 0.41 | 99.2 | White | 65 |
| 4400 | 1.60 | 69.46 | 0.50 | 97.5 | Off-White | 77 |

*Based on weight of sodium gluconate

EXAMPLE V a. sodium bisulfite (100 lbs., 0.387 percent (w/w) based on the sodium gluconate weight) was added with agitation to a gluconic acid-sodium gluconate concentrate (3315 gallons, specific gravity 1.35 pH 3.4) containing 43.70 percent (w/w) gluconic acid and 69.19 percent (w/w) sodium gluconate equivalent (gluconic acid:sodium gluconate ratio = 2.12). The mixture was then neutralized to pH 4.5 with 50 percent by weight sodium hydroxide and additional sodium bisulfite added (30 lbs., 0.116 percent (w/w) based on the sodium gluconate weight). The mixture was then neutralized to pH 6.8–7.2 with 50 percent weight sodium hydroxide and the resultant mixture dried on an atmospheric single drum rotary drier (55–60 lbs. per squre inch steam pressure). A white sodium gluconate solid of 98.8 percent purity was obtained. A 10 percent (w/v) aqueous solution of the solid had a Klett value of 82.

b. Sodium bisulfite (100 lbs., 0.375 percent (w/w) based on the sodium gluconate weight) was added with agitation to a gluconic acid-sodium gluconate concentrate (3,427 gallons, specific gravity 1.35, pH 3.4) containing 43.70 percent (w/w) gluconic acid and 69.19 percent (w/w) sodium gluconate equivalent (gluconic acid:sodium gluconate ratio = 2.12). The mixture was then neutralized to pH 6.8 with 50 percent by weight sodium hydroxide and additional sodium bisulfite added (34 lbs., 0.127 percent (w/w) based on the sodium gluconate weight). The mixture pH fell to 6.6 after the sodium bisulfite addition, and was readjusted to 6.8 by the addition of sodium hydroxide. At this point, due to an unanticipated change in scheduling, the neutralized mixture was held for 7 days before being dried on an atmospheric single drum drier (55–60 lbs. per square inch steam pressure). The resultant white sodium gluconate solid had a purity of 98.1 percent. A 10 percent (w/v) aqueous solution of the solid had a Klett value of 82.

The process of Example V can be carried out using smaller amounts of sodium bisulfite in the first addition and larger amounts in the second addition. It can also be carried out using larger amounts of sodium bisulfite in the first addition and smaller amounts in the second addition. Sodium sulfite and/or bisulfite can also be added after neutalization rather than at the lower pH level but it is preferred to add the bisulfite before neutralization since heat is generated during this operation and the presence of the bisulfite is desirable.

As previously indicated, solid sodium gluconate containing a small amount of sulfite sufficient to inhibit discoloration is a new and useful product. It can be used in cleaning solutions, especially alkaline bottle washing solutions, as a chelating agent and for many other purposes.

The invention is hereby claimed as follows:

1. In a process of producing solid sodium gluconate by evaporating water from an aqueous solution of sodium gluconate wherein the resultant solid sodium gluconate becomes discolored, the step which comprises introducing into said solution a quantity of sodium sulfite sufficient to inhibit said discoloration.

2. A process as claimed in claim 1 in which sodium bisulfite is added to said solution and sodium sulfite is formed therefrom in situ.

3. A process as claimed in claim 1 in which said aqueous solution of sodium gluconate comprises a fermentation liquor containing gluconic acid and sodium gluconate having an acidic pH, sodium bisulfite is added to said liquor while the pH is acidic, and said liquor is thereafter neutralized with caustic soda and evaporated.

4. A process as claimed in claim 1 in which said evaporation is effected on an atmospheric rotary drum drier.

5. A process as claimed claim 3 in which an additional quantity of sodium bisulfite is added to said liquor after said liquor has been at least partially neutralized.

6. A process as claimed in claim 1 in which the quantity of sulfite, expressed as sodium bisulfite, is within the range of 0.3 to 0.6 percent by weight of sodium gluconate.

7. Solid sodium gluconate inhibited against discoloration by incorporation therewith of an effective inhibiting quantity of sodium sulfite.

8. A product as claimed in claim 7 in which the quantity of sulfite is within the range of 0.3 to 0.6 percent, expressed as sodium bisulfite, of the weight of sodium gluconate.

* * * * *